(12) United States Patent
Hoenes

(10) Patent No.: US 8,607,684 B2
(45) Date of Patent: Dec. 17, 2013

(54) MULTI-FUNCTIONAL BODY ARMOR

(75) Inventor: Eric C. Hoenes, Austin, TX (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 180 days.

(21) Appl. No.: 13/322,292

(22) PCT Filed: Mar. 23, 2011

(86) PCT No.: PCT/US2011/029529
§ 371 (c)(1),
(2), (4) Date: Nov. 23, 2011

(87) PCT Pub. No.: WO2011/119673
PCT Pub. Date: Sep. 29, 2011

(65) Prior Publication Data
US 2012/0060681 A1 Mar. 15, 2012

Related U.S. Application Data

(60) Provisional application No. 61/316,426, filed on Mar. 23, 2010.

(51) Int. Cl.
*F41H 5/08* (2006.01)
(52) U.S. Cl.
USPC .................. 89/36.05; 89/36.07; 2/1

(58) Field of Classification Search
USPC ................ 428/195.1–211.1; 89/36.01–36.17; 109/49.5, 58
See application file for complete search history.

(56) References Cited

U.S. PATENT DOCUMENTS

| | | | | |
|---|---|---|---|---|
| 4,495,239 A | * | 1/1985 | Pusch et al. | 428/192 |
| 5,312,678 A | * | 5/1994 | McCullough et al. | 442/189 |
| 5,906,004 A | * | 5/1999 | Lebby et al. | 2/1 |
| 2004/0224138 A1 | * | 11/2004 | Farrell et al. | 428/209 |
| 2005/0095410 A1 | * | 5/2005 | Mazurkiewicz | 428/209 |
| 2005/0275542 A1 | | 12/2005 | Weekes | |
| 2007/0243354 A1 | * | 10/2007 | Bailey et al. | 428/64.6 |
| 2009/0053478 A1 | * | 2/2009 | Sakashita | 428/195.1 |
| 2012/0060681 A1 | * | 3/2012 | Hoenes | 89/36.02 |

FOREIGN PATENT DOCUMENTS

EP 1637828 3/2006

* cited by examiner

*Primary Examiner* — Samir Abdosh
(74) *Attorney, Agent, or Firm* — Daniel J. Long

(57) ABSTRACT

A flexible, multi-functional, multi-ply material mix and device, capable of providing ballistic protection are herein presented. The device and material herein presented provide multiple electronic and ballistic functionality integrated into a soft body armor that is lighter in weight and more comfortable to wear than previously available alternatives.

7 Claims, 3 Drawing Sheets

MULTI-FUNCTIONAL BODY ARMOR

RELATED APPLICATIONS

This application claims the benefit of the filing date of U.S. Provisional Application No. 61/316,426 filed on Mar. 23, 2010, the entire contents of which are incorporated by reference hereto.

BACKGROUND OF THE INVENTION

1. Field of the Invention

The disclosed subject matter relates to ballistic protection for military personnel. More particularly, the disclosed subject matter relates to a body armor made of integrated, multi-functional components designed to reduce the overall weight while increasing agility and durability; and to a flexible, multi-functional, multi-ply material mix capable of providing ballistic protection.

2. Brief Description of Related Art

Current soldier body armors are made of multiple layers of ballistic fabric, such as KEVLAR® brand fabric, that protect the torso from pistol shots. The addition of ceramic ballistic plates into pockets in the soft armor front, back and sides provides protection to the torso from high velocity rifle ammunition. However, such body armor may be unavoidably cumbersome, weighing up to 30 lbs when fully fitted with the ballistic plates. Adding batteries, cabling', radios, computers, GPS, and sundry other electronic devices to such a soldier system would add a further weight burden and may add to the cumbersome nature of a soldier's equipage.

SUMMARY OF THE INVENTION

A need exists, therefore, for improved ballistic protection and for a body armor system having layers of flexible materials that provide electronic and ballistic functionality integrated into a soft body armor solution.

In one embodiment, the disclosed subject matter relates to a flexible, multi-functional body armor device comprising an outer cover material facing a threat side, an inner cover material facing a skin of a user, the inner cover material being peripherally fastened to the outer cover material so as to form an inner compartment, a non-conductive flexible ballistic outer layer disposed within the inner compartment, the non-conductive flexible ballistic outer layer having a plurality of conductive ballistic antenna fibers weaved therein and at least one smart connector operatively connected to the plurality of conductive ballistic antenna fibers.

In another embodiment, the disclosed subject matter relates to a flexible, multi-functional, multi-ply material mix capable of providing ballistic protection, the flexible, multi-functional, multi-ply material mix having a first layer with antenna fibers weaved therein, a second layer of insulating fibers, the first layer overlaying the second layer. A third layer of ground plane EMI shield fibers, the second layer overlaying the third layer. A fourth layer of flexible electronics and hybrid power storage, the third layer overlaying the fourth layer. A fifth layer of insulating fibers, the fourth layer overlaying the fifth layer. A sixth layer of power and data distribution fibers, the fifth layer overlaying the sixth layer. A seventh layer of insulating fibers, the sixth layer overlaying the seventh layer. An eighth layer of ground plane EMI shield plies, the seventh layer overlaying the eighth layer. A ninth layer of ballistic fibers, the eighth layer overlaying the ninth layer and a tenth layer of thermal electric generator fibers, the ninth layer overlaying the tenth layer.

BRIEF DESCRIPTION OF THE DRAWINGS

Embodiments will be better understood from the detailed description given below and by reference to the attached drawings in which.

DETAILED DESCRIPTION OF THE INVENTION

Current soldier equipage is federated, with individual stand-alone components. This federated architecture results in duplication of subcomponents, inefficiencies and added weight. A particular concern is the proliferation of electronic systems that have to be carried by the modern war fighter, each with batteries that are usually different in design and function, resulting in a significant weight burden in spare batteries alone.

Figure 1:
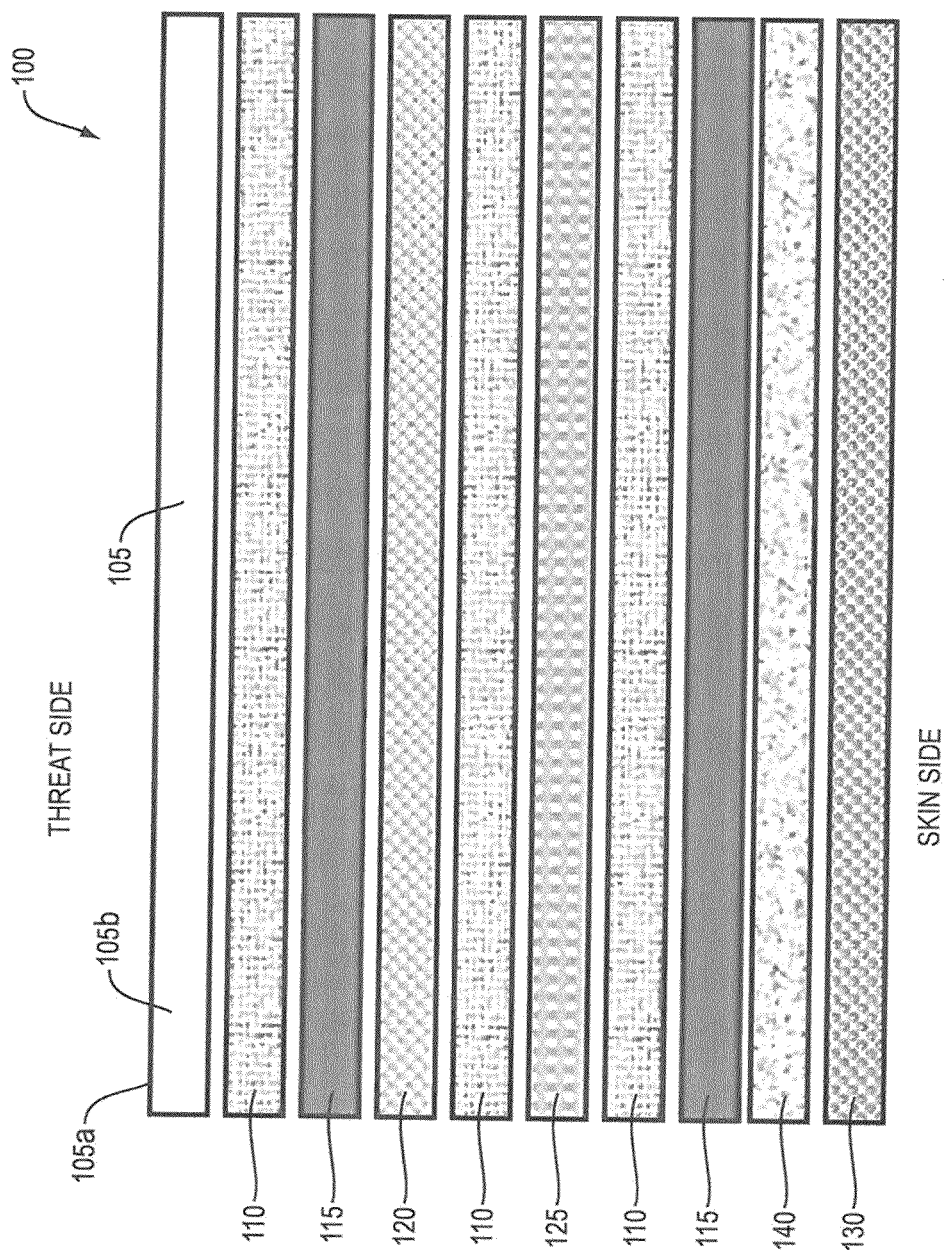
FIG. 1 is a cross-sectional view of the multi-ply material mix.

Referring to FIG. 1, a preferred arrangement of the multi-ply material mix 100 is shown. The multi-ply material mix 100 has a threat side which is closest to the outer plies 105, and a skin side, which is farthest from the outer plies 105. The outer plies 105 can be made of non-conductive, flexible ballistic fibers 105a. Such fibers 105a can include, but are not limited to, KEVLAR® brand fibers, DYNEEMA® brand fibers, and various ultrahigh molecular weight polyethylene (UHMW-PE) fibers, including, but not limited to, TENSYLON® brand fibers. In addition to the preceding sample fibers, the outer plies 105 can also include Carbon Nano-Tube (CNT) fibers.

The outer plies 105 can also include conductive ballistic fibers 105b weaved therein. It is preferred that these conductive ballistic fibers 105b are weaved in such a way as to be closest to the threat side of the multi-ply material mix 100. Such arrangement allows these conductive ballistic fibers 105b to provide antennae reception and transmission capabilities. The conductive ballistic fibers 105b can have multiple arrangements within the outer plies 105. For instance, in one embodiment the conductive ballistic fibers 105b can be spread equally throughout the surface area of the outer plies 105, while in other embodiments the conductive ballistic fibers 105b can be localized within certain regions of the outer plies 105, such as areas covering the shoulders and neckline of a garment, such as, but not limited to, a vest.

Below the outer plies 105, toward the skin side, the multi-ply material mix 100 can include at least one layer of insulator plies 110. These insulator plies 110 can be made using non-conductive ballistic fibers, which can include, but are not limited to, KEVLAR® brand fibers, DYNEEMA® brand fibers and TENSYLON® brand fibers. The insulator plies 110 can provide additional ballistic protection to a user. Furthermore, the arrangement of the insulator plies 110, within the multi-ply material mix 100 can vary. For instance, in one embodiment there can be a single layer of insulator plies 110, while in other embodiments there may be two or more layers of insulator plies 110, thereby providing increased ballistic protection to a user.

Below the layer of insulator plies 110, toward the skin side, the multi-ply material mix 100 can include a layer of shield plies 115. The shield plies 115 functions as an EMI shield layer and can be made of conductive ballistic materials, including, but not limited to, CNT fibers. In some embodiments the multi-ply material mix 100 can have a single layer of shield plies 115, while in other embodiments the multi-ply material mix 100 can have two or more layers of shield plies 115.

Below the layer of shield plies 115, toward the skin side, the multi-ply material mix 100 can include an electronics and power storage layer 120. The electronics and power storage layer 120 can be made from a number of available flexible electronics. These applications include, but are not limited to, RF electronics, general purpose processing electronics and power management electronics.

Below the layer of electronics and power storage 120, toward the skin side, the multi-ply material mix 100 can include a layer of power and data distribution plies 125. The power and data distribution plies 125 can be made of conductive ballistic materials, including but not limited to, TENSYLON® brand fiber and CNT fibers.

Below the layer of power and data distribution plies 125, toward the skin side, the multi-ply material mix 100 can include a layer of thermal electric generator plies 130. The layer of thermal electric generator plies 130 can be made of a mixture of both conductive ballistic and non-conductive ballistic fibers. The conductive ballistic fibers can include, but are not limited to, CNT fibers, while the non-conductive ballistic fibers can include, but are not limited to, KEVLAR® brand fibers, DYNEEMA® brand fibers and TENSYLON® brand fibers. Further, the ratio of conductive ballistic fibers to non-conductive ballistic fibers in the layer of thermal electric generator plies 130 can vary.

Figure 2:
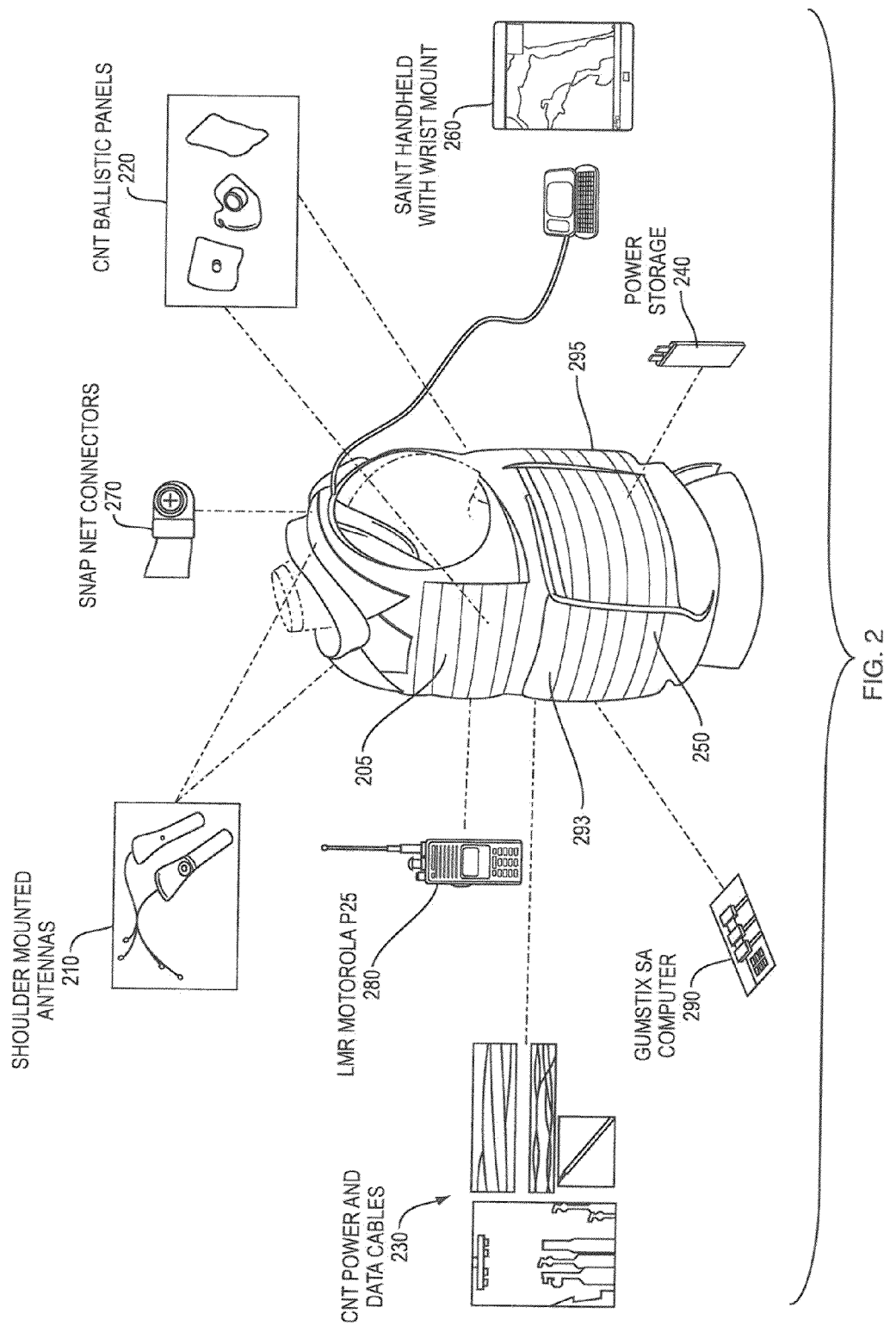
FIG. 2 is a schematical exploded view of a ballistic vest.

The multi-ply material mix 100 can be used in the construction of body armor, such as the armored vest depicted in FIG. 2 and/or the full body armor depicted in FIG. 3. However, the multi-ply material mix 100 is not limited in its use to such applications. In fact, the multi-ply material mix 100 can be used in the construction of other equipment including, but not limited to, tents, clothing, etc. Further, the ballistic properties of the multi-ply material mix 100 can be strengthened by adding additional ballistic plies 140 as desired.

The several layers of the multi-ply material mix 100 can be held together through different fastening mechanisms, including, but not limited to stitching and gluing.

Referring to FIG. 2, a ballistic vest 200 embodiment of the multi-ply material mix is shown. In this embodiment, the multi-ply material mix (not shown) can be easily incorporated into a ballistic vest 200, which in one embodiment can be shaped like a human torso, having a front side and a back side. The ballistic vest 200 includes an outer cover 205 and an inner cover (not shown), which are peripherally sewn to create an inner compartment (not shown) in which the multi-ply material mix (not shown) is disposed. Accordingly, the ballistic vest 200 is capable of providing a user ballistic protection, while at the same time providing a number of integrated capabilities.

For instance, the ballistic vest is capable of providing integrated antennae transmission and reception capabilities by incorporating antennae fibers 210. In one embodiment, the antennae fibers 210 can be made out of conductive ballistic fibers located on the outer plies (not shown) multi-ply material mix (not shown), the antennae fibers 210 can be positioned near the shoulder area of the ballistic vest 200, where they can most effectively provide the user, antennae transmission and reception capabilities. In other embodiments, the antennae fibers 210 can be positioned around the neck line of the ballistic vest, or wrap around the shoulder blade area of the ballistic vest 200. Preferably, the antennae fibers 210 are placed directly below the outer cover 205, so as to improve performance. Because the multi-ply material mix (not shown) incorporates a number ballistic fibers, the ballistic vest 200 is capable of providing 360° ballistic protection.

The arrangement of the fibers in the multi-ply mix can modified to meet the requirements of different applications. For instance, in the vest 200 embodiment, additional CNT fibers 220, which provide increased ballistic protection, can be placed to protect sensitive areas, such as those covering the vital organs of user.

The ballistic vest 200 can also be equipped with a region of power and data distribution fibers 230. These power and data distribution fibers 230 can be both conductive ballistic and non-conductive ballistic fibers. Additionally, the power and data distribution fibers 230 can be arranged virtually anywhere on the ballistic vest 200, and are therefore not restricted in placement to any given region within the ballistic vest 200. In other embodiments, additional ballistic protection can also be provided by incorporating non-conductive ballistic fibers (not shown). These non-conductive ballistic fibers can include, but are not limited to, KEVLAR® brand fibers, DYNEEMA® brand fibers and TENSYLON® brand fibers.

The ballistic vest 200 is also capable of harnessing and storing energy in a power storage unit 240. For instance, in one embodiment conductive ballistic fibers can channel harnessed energy (i.e. thermal energy) for storage in a power storage unit 240. Power and data distribution fibers 230 can then be used to access the power storage unit 240 and make this power available to external devices via smart connectors 270. In some embodiments, the power storage unit 240 may be capable to store up to 96 hours of usable power.

As was noted above, data and power transfer to and from the ballistic vest 200 can be achieved by incorporating smart connectors 270, including, but not limited to, SNAP Net® brand connectors. These smart connectors 270 come in a variety of snap geometries and therefore allow for the integration of a variety of applications, including, but not limited to, USB devices, RF antennas and various other electronic devices. Further, the placement of the smart connectors 270 is not limited to the shoulder area, as the smart connectors 270 may be placed virtually anywhere on the ballistic vest 200.

Additionally, the ability to transmit power from the power storage unit 240 via the power and data distribution fibers 230 allows the ballistic vest 200 to be fitted with additional electronic devices, including but not limited to, small single-board computers 290 such as GUMSTIX® brand computers and SAINT® brand handheld devices 260.

Further, the ballistic vest 200 can be equipped with any desired number of storage compartments 250. These storage compartments 250 can be constructed out of the same materials as the ballistic vest 200, and therefore provide a convenient means to store and transport cargo without compromising safety. The cargo can vary depending on the application and may include land mobile radio units 280, handheld devices 260, single-board computers 290, etc. Additionally, the storage compartments 250 can be placed in any desired location on the ballistic vest 200.

The ballistic vest 200 can also be equipped with an EMI shield 293. The EMI shield 293 can be made of ballistic fibers, including, but not limited to, CNT fibers. These ballistic fibers provide a great degree of flexibility and exhibit reduced weight, compared to traditional metal EMI shield applications. Accordingly, the ballistic vest 200 can be fitted with an EMI shield 293 throughout the vest, thereby providing 360° magnetic radiation protection, without increasing ballistic vest 200 weight and while retaining ballistic vest 200 flexibility. In other embodiments, additional layers of EMI shield 293 can be disposed in areas of the ballistic vest 200 that protect vital organs. For example, in one embodiment, additional EMI shield 293 layers can be disposed in the frontal section of the ballistic vest 200, while in other embodiments additional EMI shield 293 layers can be disposed in the dorsal section of the ballistic vest 200.

The ballistic vest 200 can also be fitted with a layer of flexible electronics 295. The flexible electronics 295 layer can be distributed through the ballistic vest 200. The flexible electronics 295, can include, but are not limited to RF electronics, general purpose processing and power management electronics.

Figure 3B:
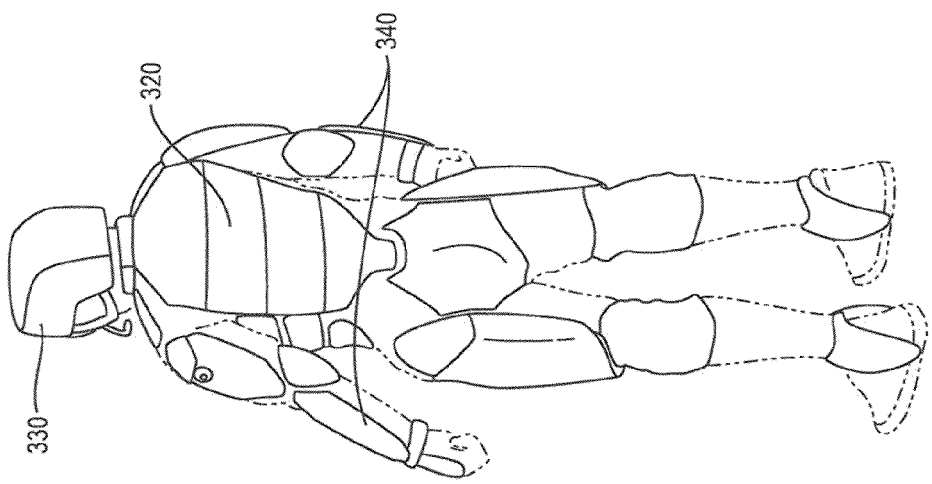
FIG. 3b is a dorsal view of a full body armor.
Figure 3A:
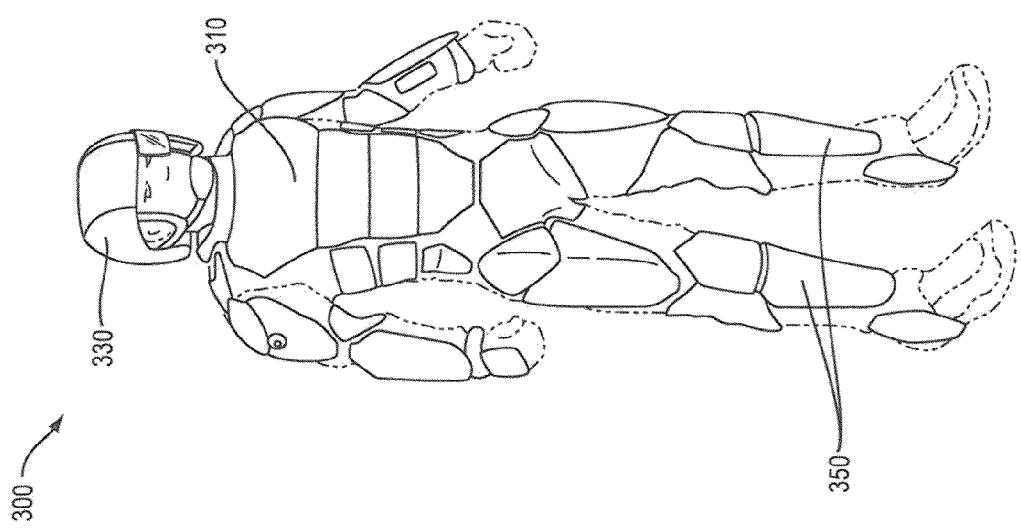
FIG. 3a is a frontal view of a full body armor.

Referring to FIGS. 3a and 3b, a full body ballistic armor 300 embodiment of the multi-ply material mix is shown. That is the in addition to protecting the anterior 310 and posterior 320 regions of the torso, the multi-ply material mix (not shown) can be use to provide full body ballistic protection including, the head 330, upper limbs 340 and lower limbs 350. Because of the high flexibility and reduced weight (compared to traditional federated ballistic materials) the bull body ballistic armor 300 provides improved mobility without compromising threat protection.

It is to be understood, that the above-described arrangements are intended solely to illustrate the application of the principles of the disclosed subject matter. Numerous modifications and alternative arrangements may be devised by those skilled in the art without departing from the spirit and scope of the disclosed subject matter in the present Application. Accordingly, the appended claims are intended to cover such modifications and alternative arrangements. Thus, while the disclosed subject matter of the present Application has been described above with particularity and detail in connection with what is presently deemed to be the most practical and preferred embodiments, it will be apparent to those skilled in the art that numerous modifications, including, but not limited to, variations in size, materials, shape, form, function and manner of operation, assembly and use may be made without departing from the principles and concepts set forth herein.

What is claimed is:

1. A flexible, multi-functional, multi-ply material mix capable of providing ballistic protection, the flexible, multi-functional, multi-ply material mix comprising:
   a first layer having antenna fibers weaved therein;
   a second layer of insulating fibers, the first layer overlaying the second layer;
   a third layer of ground plane EMI shield fibers, the second layer overlaying the third layer;
   a fourth layer of flexible electronics and hybrid power storage, the third layer overlaying the fourth layer;
   a fifth layer of insulating fibers, the fourth layer overlaying the fifth layer;
   a sixth layer of power and data distribution fibers, the fifth layer overlaying the sixth layer;
   a seventh layer of insulating fibers, the sixth layer overlaying the seventh layer;
   an eighth layer of ground plane EMI shield fibers, the seventh layer overlaying the eighth layer;
   a ninth layer of ballistic fibers, the eighth layer overlaying the ninth layer; and
   a tenth layer of thermal electric generator fibers, the ninth layer overlaying the tenth layer.

2. The flexible, multi-functional, material mix of claim 1, wherein the antenna fibers are made of conductive ballistic materials, such as CNT fibers.

3. The flexible, multi-functional, multi-ply material mix of claim 1, wherein the insulating fibers of the second layer, fifth layer and seventh layer are made of non-conductive ballistic materials.

4. The flexible, multi-functional, multi-ply material mix of claim 1, wherein the layer of ground plane EMI shield plies of the third layer and eighth layer are made of conductive ballistic material such as CNT fibers.

5. The flexible, multi-functional, multi-ply material mix of claim 1, wherein the thermal electric generator fibers of the tenth layer are made of a mixture of non-conductive ballistic materials and conductive ballistic materials.

6. The flexible, multi-functional, multi-ply material mix of claim 1, wherein the flexible electronics of the fourth layer can be selected from the group consisting of RF electronics, general purpose processing electronics and power management electronics.

7. A flexible, multi-functional body armor device comprising:
   an outer cover material facing a threat side;
   an inner cover material facing a skin of a user, the inner cover material and outer cover material being peripherally fastened so as to form an inner compartment; and
   a flexible multi-functional, multi-ply material mix capable of providing ballistic protection, the flexible, multi-functional, multi-ply material mix comprising;
   a first layer having antenna fibers weaved therein;
   a second layer of insulating fibers, the first layer overlaying the second layer;
   a third layer of ground plane EMI shield fibers, the second layer overlaying the third layer;
   a fourth layer of flexible electronics and hybrid power storage, the third layer overlaying the fourth layer;
   a fifth layer of insulating fibers, the fourth layer overlaying the fifth layer;
   a sixth layer of power and data distribution fibers, the fifth layer overlaying the sixth layer;
   a seventh layer of insulating fibers, the sixth layer overlaying the seventh layer;
   an eighth layer of ground plane EMI shield fibers, the seventh layer overlaying the eighth layer;
   a ninth layer of ballistic fibers, the eighth layer overlaying the ninth layer; and
   a tenth layer of thermal electric generator fibers, the ninth layer overlaying the tenth layer being disposed in the inner compartment, such that the first layer of the flexible, multi-functional, multi-ply material mix is positioned in contact with the outer cover material and the tenth layer of the flexible, multi-functional, multi-ply material mix is positioned in contact with the inner cover.

* * * * *